United States Patent Office 3,200,111
Patented Aug. 10, 1965

3,200,111
CERTAIN 1-(2-TERTIARY AMINOETHOXY)GUANIDINES AND THEIR PREPARATION
Leo A. Paquette, Portage Township, Kalamazoo County, Mich., assignor to The Upjohn Company, Kalamazoo, Mich., a corporation of Delaware
No Drawing. Filed Aug. 27, 1963, Ser. No. 304,974
6 Claims. (Cl. 260—239)

This invention relates to novel compounds and to a process for their preparation and is particularly directed to novel 1-(2-aminoethoxy)guanidines and their preparation.

The novel 1-(2-aminoethoxy)guanidines are represented by the formula:

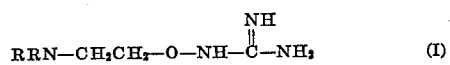

$$RRN-CH_2CH_2-O-NH-\overset{NH}{\underset{\parallel}{C}}-NH_2 \quad (I)$$

wherein RRN— is selected from the group consisting of diloweralkylamino and the heterocyclic moieties, aziridinyl, azetidinyl, pyrrolidinyl, piperidino, hexahydroazepinyl, heptamethylenimino, octamethylenimino, morpholino, and thiomorpholino, each of said heterocyclic moieties having attached as substituents on carbon atoms thereof zero to 3 loweralkyls, inclusive. When RRN— is diloweralkylamino, the loweralkyls, R, can be the same or different. When RRN— is a heterycyclic moiety with 2 or more alkyls, the alkyls can be the same or different. Examples of loweralkyls within the scope of diloweralkylamino are methyl, ethyl, propyl, butyl, pentyl, hexyl, heptyl, octyl, and the isomeric forms thereof. Examples of heterocyclic moieties within the scope of RRN— are aziridinyl, 2-methylaziridinyl, 2-ethylaziridinyl, 2-butylaziridinyl, 2,3-dimethylaziridinyl, 2,2-dimethylaziridinyl, azetidinyl, 2-methylazetidinyl, 3-methylazetidinyl, 2-octylazetidinyl, 2,2-dimethylazetidinyl, 3,3-diethylazetidinyl, 2,4,4-trimethylazetidinyl, 2,3,4-trimethylazetidinyl, pyrrolidinyl, 2-methylpyrrolidinyl, 3-butylpyrrolidinyl, 2-isohexylpyrrolidinyl, 2,3-dimethylpyrrolidinyl, 2,2-dimethylpyrrolidinyl, 2,5-diethylpyrrolidinyl, 3-tert-butylpyrrolidinyl, 2,3,5-trimethylpyrrolidinyl, 3,4-dioctylpyrrolidinyl, piperidino, 2-methylpiperidino, 3-methylpiperidino, 4-methylpiperidino, 3-isopropylperidino, 4-tert-butylpiperidino, 2-methyl-5-ethylpiperidino, 3,5-dipentylpiperidino, 2,4,6-trimethylpiperidino, 2,6-dimethyl-4-octylpiperidino, 2,3,5-triethylpiperidino, hexahydroazepinyl, 2-ethylhexahydroazepinyl, 4-tert-butylhexahydroazepinyl, 3-heptylhexahydroazepinyl, 2,4-dimethylhexahydroazepinyl 3,3-dimethylhexahydroazepinyl, 2,4,6-tripropylhexahydroazepinyl, heptamethylenimino, 2-methylheptamethylenimino, 5-butylheptamethylenimino, 2,4-diisopropylheptamethylenimino, 3,3-diethylheptamethylenimino, 2,5,8-trimethylheptamethylenimino, octamethylenimino, 3-methyloctamethylenimino, 2,9-diethyloctamethylenimino, 4-isooctyloctamethylenimino, morpholino, 2-ethylmorpholino, 2-methyl-5-ethylmorpholino, 3,3-dimethylmorpholino, 2,6-ditert-butylmorpholino, thiamorpholino, 3-methylthiamorpholino, 2,2-diethylthiamorpholino, 2,6-dihexylthiamorpholino, and the like. In each of the above examples of heterocyclic moieties, the free valence, and hence the point of attachment to the oxygen atom in Formula I, is on the heterocyclic nitrogen atom.

The novel 1-(2-aminoethoxy)guanidines of Formula I exist either in the nonprotonated (free base) form or the protonated form depending upon the pH of the environment. They form stable protonates (acid addition salts) on neutralization with suitable acids, for example, hydrochloric, hydrobromic, sulfuric, phosphoric, nitric, perchloric, thiocyanic, fluosilicic, acetic, benzoic, salycylic, glycolic, succinic, nicotinic, tartaric, maleic, malic, lactic, methanesulfonic, and cyclohexanesulfamic acids, and the like. These acid addition salts are useful in upgrading the free bases. The corresponding free bases are useful as acid acceptors in neutralizing undesirable acidity or in absorbing an acid as it is formed in a chemical reaction, for example, a dehydrohalogenation reaction in which hydrogen and chlorine, bromine, or iodine, are removed from vicinal carbon atoms. They are dibasic and form both mono- and di-acid addition salts.

The novel 1-(2-aminoethoxy)guanidines of the invention can be prepared by reacting 2-methyl-2-thiopseudourea sulfate with an aminoethoxyamine of the formula:

$$RRN-CH_2CH_2-O-NH_2 \quad (II)$$

wherein RRN— is as given above. The reaction advantageously is effected in aqueous solution at reflux temperature for about 2 to about 20 hours. The resulting sulfate salt can be converted to the free base form by treatment with aqueous alkali hydrxide, e.g., sodium or potassium hydroxide, and the liberated free base can be converted to other acid addition salts by neutralization with acid. Acid addition salts of the sulfate or other mono salts can be formed in the same manner. Acid addition salts can also be formed by metathesis.

The thiocyanic acid addition salts of the 1-(2-aminoethoxy)guanidines of Formula I, when condensed with formaldehyde, form resinous materials useful as pickling inhibitors according to U.S. Patents 2,425,320 and 2,606,155. The compounds of Formula I also form fluosilicic acid addition salts which are useful as mothproofing agents according to U.S. Patents 1,915,334 and 2,075,359.

The Formula I compounds of this invention also form salts with penicillins. These salts have solubility characteristics which cause them to be useful in the isolation and purification of penicillins, particularly benzyl penicillin. Said salts can be formed either by neutralization of the free base form of a compound of Formula I with the free acid form of a penicillin, or by a metathetical exchange of the anion of an acid addition salt of a compound of Formula I, for example, the chloride ion of a hydrochloride, with the anionic form of a penicillin.

The novel compounds of Formula I in their protonated and nonprotonated forms exhibit anorexigenic, hypotensive, and anti-inflammatory activities in test animals such as mice and rats and are useful as in arresting or alleviating hunger, hypertension, and inflammation in mammals, e.g., man and rodents, birds, e.g., poultry, and other animals.

The aminoethoxyamine starting compounds can be prepared by reacting an alkali metal salt of acetone oxime, e.g., sodium acetone oxime, with a chloroethylamine of the formula:

$$RRN-CH_2CH_2-Cl \quad (III)$$

to form a compound of the formula:

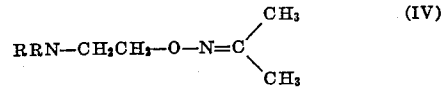

$$RRN-CH_2CH_2-O-N=C\begin{matrix}CH_3\\ \\CH_3\end{matrix} \quad (IV)$$

and subjecting the oxime IV to acid hydrolysis to form starting compounds of Formula II, RRN— being as given above. For example, 2-diloweralkylaminoethoxyamines can be prepared by the procedure of Examples 1 and 3 of U.S. Patent 3,060,177 and the 2-cyclicaminoethoxyamines by substituting the appropriate 2-cyclicaminoethyl chloride for the 2-diloweralkylaminoethyl chlorides used in these examples. The novel compounds of the invention can also be produced by substituting 2-methyl-2-thiopseudourea and water for the pyridine aldehydes and alcohol, respectively, of Examples 1, 3, 22, and 24 of U.S. Patent 3,060,177.

The invention may be more fully understood by the following examples which embody the best manner known for carrying out the invention.

Example 1.—1-[2-(1-hexahydroazepinyl)ethoxy]guanidine hydrogen sulfate

A solution of 15.8 g. (0.10 mole) of 1-(2-aminooxyethyl)hexamethylenimine and 13.9 g. (0.10 mole) of 2-methyl-2-thiopseudourea sulfate in 65 ml. of water was refluxed for 4 hours. The solution was concentrated to one-half of its original volume and treated with an equal volume of ethanol. After cooling, the white crystals were removed by filtration and dried to give 12.8 g. (86.0%) of 1-[2-(1-hexahydroazepinyl)ethoxy]guanidine hydrogen sulfate, M.P. 215° C. (with prior sintering at 180° C.). Three recrystallizations of this material from aqueous ethanol gave white needles, M.P. 255–256° C.

*Analysis.*—Calcd. for $C_9H_{22}N_4O_5S$: C, 36.23; H, 7.43; N, 18.78. Found: C, 36.26; H, 7.59; N, 18.56.

Example 2.—1-[2-(1-pyrrolidinyl)ethoxy]guanidine hydrogen sulfate

A solution of 13.0 g. (0.10 mole) of 1-(2-aminooxyethyl)pyrrolidine and 13.9 g. (0.10 mole) of 2-methyl-2-thiopseudourea sulfate in 65 ml. of water was refluxed for 4 hours. The solution was concentrated to one-half of its original volume and treated with an equal volume of ethanol. After cooling, the white crystals were removed by filtration and dried to give 10.5 g. (78.2%) of 1-[2-(1-pyrrolidinyl)ethoxy]guanidine hydrogen sulfate, M.P. 240–243° C. (dec.). Three recrystallizations of this material from aqueous ethanol gave clusters of white needles, M.P. 246–247° C. (dec.).

*Analysis.*—Calcd. for $C_7H_{18}N_4O_5S$: C, 31.10; H, 6.71; N, 20.73. Found: C, 31.28; H, 6.50; N, 20.52.

By substituting the 1-(2-aminooxyethyl)hexamethylenimine and 1-(2-aminooxyethyl)pyrrolidine of Examples 1 and 2 by N-(2-aminooxyethyl)dimethylamine,
N-(2-aminooxyethyl)diethylamine,
N-(2-aminooxyethyl)dipropylamine,
N-(2-aminooxyethyl)diisopropylamine,
N-(2-aminooxyethyl)N-methylisopropylamine,
N-(2-aminooxyethyl)dibutylamine,
N-(2-aminooxyethyl)di-sec-butylamine,
N-(2-aminooxyethyl)diisobutylamine,
N-(2-aminooxyethyl)di-tert-butylamine,
N-(2-aminooxyethyl)-N-methylbutylamine,
N-(2-aminooxyethyl)-N-ethyl-sec-butylamine,
N-(2-aminooxyethyl)dipentylamine,
N-(2-aminooxyethyl)diisopentylamine,
N-(2-aminooxyethyl)-N-methylpentylamine,
N-(2-aminooxyethyl)-N-ethyl-2-methylbutylamine,
N-(2-aminooxyethyl)dihexylamine,
N-(2-aminooxyethyl)diisohexylamine,
N-(2-aminooxyethyl)-N-methylhexylamine,
N-(2-aminooxyethyl)-N-ethyl-2,3-dimethylbutylamine,
N-(2-aminooxyethyl)-N-ethyl-propylamine,
1-(2-aminooxyethyl)aziridine,
1-(2-aminooxyethyl)-2-methylaziridine,
1-(2-aminooxyethyl)-2,3-dimethylaziridine,
1-(2-aminooxyethyl)-2,2-dimethylaziridine,
1-(2-aminooxyethyl)azetidine,
1-(2-aminooxyethyl)-2-methylazetidine,
1-(2-aminooxyethyl)-3-methylazetidine,
1-(2-aminooxyethyl)-2-octylazetidine,
1-(2-aminooxyethyl)-2,2-dimethylazetidine,
1-(2-aminooxyethyl)-3,3-dimethylazetidine,
1-(2-aminooxyethyl)-2,4,4-trimethylazetidine,
1-(2-aminooxyethyl)pyrrolidine,
1-(2-aminooxyethyl)-2-methylpyrrolidine,
1-(2-aminooxyethyl)-3-butylpyrrolidine,
1-(2-aminooxyethyl)-2-isohexylpyrrolidine,
1-(2-aminooxyethyl)-2,3-dimethylpyrrolidine,
1-(2-aminooxyethyl)-2,2,4-trimethylpyrrolidine,
1-(2-aminooxyethyl)-2,2-dimethylpyrrolidine,
1-(2-aminooxyethyl)-2,5-diethylpyrrolidine,
1-(2-aminooxyethyl)-3-tert-butylpyrrolidine,
1-(2-aminooxyethyl)-3,4-dioctylpyrrolidine,
1-(2-aminooxyethyl)piperidine,
1-(2-aminooxyethyl)-2-methylpiperidine,
1-(2-aminooxyethyl)-3-methylpiperidine,
1-(2-aminooxyethyl)-4-methylpiperidine,
1-(2-aminooxyethyl)-3-isopropylpiperidine,
1-(2-aminooxyethyl)4-tert-butylpiperidine,
1-(2-aminooxyethyl)-2,4,6-trimethylpiperidine,
1-(2-aminooxyethyl)-2-methyl-5-ethylpiperidine,
1-(2-aminooxyethyl)-3,5-dipentylpiperidine,
1-(2-aminooxyethyl)-2,6-dimethyl-4-octylpiperidine,
1-(2-aminooxyethyl)hexahydroazepine,
1-(2-aminooxyethyl)-2-ethylhexahydroazepine,
1-(2-aminooxyethyl)-4-tert-butylhexahydroazepine,
1-(2-aminooxyethyl)-3,3-dimethylhexahydroazepine,
1-(2-aminooxyethyl)-2,4,6-tripropylhexahydroazepine,
1-(2-aminooxyethyl)heptamethylenimine,
1-(2-aminooxyethyl)-2-ethylheptamethylenimine,
1-(2-aminooxyethyl)-2,4-diisopropylheptamethylenimine,
1-(2-aminooxyethyl)-3,3-dimethylheptamethylenimine,
1-(2-aminooxyethyl)octamethylenimine,
1-(2-aminooxyethyl)-3-methyloctamethylenimine,
1-(2-aminooxyethyl)-4-isooctyloctamethylenimine,
1-(2-aminooxyethyl)morpholine,
1-(2-aminooxyethyl)-2,2-diethylmorpholine,
1-(2-aminooxyethyl)-2-methyl-5-ethylmorpholine,
1-(2-aminooxyethyl)-3,3-dimethylmorpholine,
1-(2-aminooxyethyl)thiamorpholine,
1-(2-aminooxyethyl)-3-methylthiamorpholine, and
1-(2-aminooxyethyl)-2,2-dipentylthiamorpholine,
there are obtained 1-[2-(dimethylamino)ethoxy]guanidine hydrogen sulfate,
1-[2-(diethylamino)-ethoxy]guanidine hydrogen sulfate,
1-[2-(dipropylamino)-ethoxy]guanidine hydrogen sulfate,
1-[2-(diisopropylamino)-ethoxy)guanidine hydrogen sulfate,
1-[2-(N-methylisopropylamino)ethoxy]guanidine hydrogen sulfate,
1-[2-(dibutylamino)-ethoxy]guanidine hydrogen sulfate,
1-[2-(di-sec-butylamino)-ethoxy]guanidine hydrogen sulfate,
1-[2-(diisobutylamino)-ethoxy]guanidine hydrogen sulfate,
1-[2-(di-tert-butylamino)-ethoxy]guanidine hydrogen sulfate,
1-[2-(N-methylbutylamino)ethoxy]guanidine hydrogen sulfate,
1-[2-(N-ethyl-sec-butylamino)ethoxy]guanidine hydrogen sulfate,
1-[2-dipentylamino)ethoxy]guanidine hydrogen sulfate,
1-[2-(diisopentylamino)ethoxy]guanidine hydrogen sulfate,
1-[2-(N-methylpentylamino)ethoxy]guanidine hydrogen sulfate,
1-[2-(N-ethyl-2-methylbutylamino)ethoxy]guanidine hydrogen sulfate,
1-[2-(dihexylamino)ethoxy]guanidine hydrogen sulfate,
1-[2-(diisohexylamino)ethoxy]guanidine hydrogen sulfate,
1-[2-(N-methylhexylamino)ethoxy]guanidine hydrogen sulfate,
1-[2-(N-ethyl-2,3-dimethylbutylamino)ethoxy]guanidine hydrogen sulfate,
1-[2-(N-ethylpropylamino)ethoxy]guanidine hydrogen sulfate,
1-[2-(1-aziridinyl)ethoxy]guanidine hydrogen sulfate,
1-[2-(2-methyl-1-aziridinyl)ethoxy]guanidine hydrogen sulfate,
1-[2-(2,3-dimethyl-1-aziridinyl)ethoxy]guanidine hydrogen sulfate,
1-[2-(2,2-dimethyl-1-aziridinyl)ethoxy]guanidine hydrogen sulfate,
1-[2-(1-azetidinyl)ethoxy]guanidine hydrogen sulfate,
1-[2-(2-methyl-1-azetidinyl)ethoxy]guanidine hydrogen sulfate,
1-[2-(3-methyl-1-azetidinyl)ethoxy]guanidine hydrogen sulfate, 1-[2-(2-octyl-1-azetidinyl)ethoxy]guanidine hydrogen sulfate,
1-[2-(2,2-dimethyl-1-azetidinyl)ethoxy]guanidine hydrogen sulfate,
1-[2-(3,3-dimethyl-1-azetidinyl)ethoxy]guanidine hydrogen sulfate,
1-[2-(2,4,4-trimethyl-1-azetidinyl)ethoxy]guanidine hydrogen sulfate,
1-[2-(1-pyrrolidinyl)ethoxy]guanidine hydrogen sulfate,
1-[2-(2-methyl-1-pyrrolidinyl)ethoxy]guanidine hydrogen sulfate,
1-[2-(3-butyl-1-pyrrolidinyl)ethoxy]guanidine hydrogen sulfate,
1-[2-(2-isohexyl-1-pyrrolidinyl)ethoxy]guanidine hydrogen sulfate,
1-[2-(2,3-dimethyl-1-pyrrolidinyl)ethoxy]guanidine hydrogen sulfate,
1-[2-(2,2,4-trimethyl-1-pyrrolidinyl)ethoxy]guanidine hydrogen sulfate,
1-[2-(2,2-dimethyl-1-pyrrolidinyl)ethoxy]-guanidine hydrogen sulfate,
1-[2-(2,5-diethyl-1-pyrrolidinyl)ethoxy]guanidine hydrogen sulfate,
1-[2-(3-tert-butyl-1-pyrrolidinyl)ethoxy]guanidine hydrogen sulfate,
1-[2-(3,4-dioctyl-1-pyrrolidinyl)ethoxy]guanidine hydrogen sulfate,
1-[2-(piperidino)ethoxy]guanidine hydrogen sulfate,
1-[2-(2-methylpiperidino)ethoxy]guanidine hydrogen sulfate,
1-[2-(3-methylpiperidino)ethoxy]guanidine hydrogen sulfate,
1-[2-(4-methylpiperidino)ethoxy]guanidine hydrogen sulfate,
1-[2-(3-isopropylpiperidino)ethoxy]guanidine hydrogen sulfate,
1-[2-(4-tert-butylpiperidino)ethoxy]guanidine hydrogen sulfate,
1-[2-(2,4,6-trimethylpiperidino)ethoxy]guanidine hydrogen sulfate,
1-[2-(2-methyl-5-ethylpiperidino)ethoxy]guanidine hydrogen sulfate,
1-[2-(3,5-dipentylpiperidino)ethoxy]guanidine hydrogen sulfate,
1-[2-(2,6-dimethyl-4-octylpiperidino)ethoxy]guanidine hydrogen sulfate,
1-[2-(1-hexahydroazepinyl)ethoxy]guanidine hydrogen sulfate,
1-[-(2-ethyl-1-hexahydroazepinyl)ethoxy]guanidine hydrogen sulfate,
1-[2-(4-tert-butyl-1-hexahydroazepinyl)ethoxy]guanidine hydrogen sulfate,
1-[2-(3,3-dimethyl-1-hexahydroazepinyl)ethoxy]guanidine hydrogen sulfate,
1-[2-(2,4,6-tripropyl-1-hexahydroazepinyl)ethoxy]guanidine hydrogen sulfate,
1-[2-(heptamethylenimino)ethoxy]guanidine hydrogen sulfate,
1-[2-(2-ethylheptamethylenimino)ethoxy]guanidine hydrogen sulfate,
1-[2-(2,4-diisopropylheptamethylenimino)ethoxy]guanidine hydrogen sulfate,
1-[2-(3,3-dimethylheptamethylenimino)ethoxy]guanidine hydrogen sulfate,
1-[2-(octamethylenimino)ethoxy]guanidine hydrogen sulfate,
1-[2-(3-methyloctamethylenimino)ethoxy]guanidine hydrogen sulfate,
1-[2-(4-isooctyloctamethylenimino)ethoxy]guanidine hydrogen sulfate,
1-[2-(morpholino)ethoxy]guanidine hydrogen sulfate,
1-[2-(2,2-diethylmorpholino)ethoxy]guanidine hydrogen sulfate,
1-[2-(2-methyl-5-ethylmorpholino)ethoxy]guanidine hydrogen sulfate,
1-[2-(3,3-dimethylmorpholino)ethoxy]guanidine hydrogen sulfate,
1-[2-(thiamorpholino)ethoxy]guanidine hydrogen sulfate,
1-[2-(3-methylthiamorpholino)ethoxy]guanidine hydrogen sulfate, and
1-[2-(2,2-dipentylthiamorpholino)ethoxy]guanidine hydrogen sulfate, respectively.

I claim:

1. A compound selected from the group consisting of the free base and acid addition salt forms of a compound of the formula:

   (I)

wherein RRN— is selected from the group consisting of diloweralkylamino and the heterocyclic moieties, aziridinyl, azetidinyl, pyrrolidinyl, piperidino, hexahydroazepinyl, heptamethylenimino, octamethylenimino, morpholino, and thiamorpholino, each of said heterocyclic moieties having attached as substituents on carbon atoms thereof zero to 3 loweralkyls, inclusive.

2. 1-[2-(1-hexahydroazepinyl)ethoxy]guanidine hydrogen sulfate.

3. 1-[2-(1-hexahydroazepinyl)ethoxy]guanidine.

4. 1-[2-(1-pyrrolidinyl)ethoxy]guanidine hydrogen sulfate.

5. 1-[2-(1-pyrrolidinyl)ethoxy]guanidine.

6. The method of making compounds of claim 1 which comprises reacting 2-methyl-2-thiopseudourea with a compound of the formula:

wherein RRN— is as given in claim 1.

No references cited.

NICHOLAS S. RIZZO, *Primary Examiner.*